United States Patent
Safronoff et al.

(10) Patent No.: US 10,606,585 B1
(45) Date of Patent: Mar. 31, 2020

(54) COMPUTER-BASED SYSTEMS CONFIGURED FOR AUTOMATED ROLL-FORWARD OF SOFTWARE PACKAGE VERSIONS AND METHODS OF USE THEREOF

(71) Applicant: Capital One Services, LLC, McLean, VA (US)

(72) Inventors: Daniel Vincent Safronoff, Vienna, VA (US); James Louis Laiche, Richmond, VA (US); Bradley Clarke Dellinger, Philadelphia, PA (US); Ron Meck, Toano, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/680,786

(22) Filed: Nov. 12, 2019

(51) Int. Cl.
*G06F 8/71* (2018.01)
*G06F 9/54* (2006.01)
*G06F 8/658* (2018.01)

(52) U.S. Cl.
CPC ............... *G06F 8/71* (2013.01); *G06F 8/658* (2018.02); *G06F 9/54* (2013.01)

(58) Field of Classification Search
None
See application file for complete search history.

(56) References Cited

U.S. PATENT DOCUMENTS

| | | | |
|---|---|---|---|
| 6,321,374 B1 * | 11/2001 | Choy | G06F 16/284 717/106 |
| 6,557,054 B2 * | 4/2003 | Reisman | G06F 8/65 710/33 |
| 6,694,320 B1 * | 2/2004 | Ortiz | G06F 9/445 |
| 9,235,409 B1 * | 1/2016 | Guo | G06F 8/60 |
| 9,916,233 B1 * | 3/2018 | Qureshi | G06F 11/3692 |
| 10,379,838 B1 * | 8/2019 | Chud | G06F 8/71 |
| 10,498,665 B1 * | 12/2019 | Meck | G06F 16/953 |

(Continued)

OTHER PUBLICATIONS

C. Cadar and P. Hosek, "Multi-version software updates," 2012 4th International Workshop on Hot Topics in Software Upgrades (HotSWUp), Zurich, 2012, pp. 36-40. URL: http://ieeexplore.ieee.org/stamp/stamp.jsp?tp=&arnumber=6226615&isnumber=6226605 (Year: 2012).*

(Continued)

*Primary Examiner* — Wei Y Zhen
*Assistant Examiner* — Binh Luu
(74) *Attorney, Agent, or Firm* — Greenberg Traurig, LLP

(57) ABSTRACT

In order to facilitate automatic roll-forward updates, embodiments include detecting a failure in a software package. In response to the failure, data indicative of a current version of a software package is extracted from a release directory. In response to the application data, a base repository with a version history of the application is cloned. In response to the cloning, a prior set of changes from the base repository in the temporary directory, where the prior set of changes form an old application version of the application, is imported. In response to the import of the prior set of changes, the current version is overwritten with the prior set of changes to generate a new version. The new version is pushed directly to the base repository and a deployment API causes the new version to replace the current version.

20 Claims, 8 Drawing Sheets

(56) References Cited

U.S. PATENT DOCUMENTS

| | | | | |
|---|---|---|---|---|
| 2005/0021487 A1* | 1/2005 | Verma | ................ | G06F 16/10 |
| 2005/0039196 A1* | 2/2005 | Sasidharan | ................ | G06F 8/65 |
| | | | | 719/331 |
| 2007/0083530 A1* | 4/2007 | Lakshminath | ................ | G06F 9/466 |
| 2011/0214018 A1* | 9/2011 | Vidal | ................ | G06F 11/0751 |
| | | | | 714/25 |
| 2011/0214021 A1* | 9/2011 | Vidal | ................ | G06F 8/65 |
| | | | | 714/38.1 |
| 2013/0262396 A1* | 10/2013 | Kripalani | ................ | G06F 11/1456 |
| | | | | 707/674 |
| 2014/0149492 A1* | 5/2014 | Ananthanarayanan | ................ | G06F 9/5072 |
| | | | | 709/203 |
| 2014/0208306 A1* | 7/2014 | Halder | ................ | G06F 8/65 |
| | | | | 717/172 |
| 2014/0282457 A1* | 9/2014 | Chow | ................ | G06F 8/54 |
| | | | | 717/164 |
| 2015/0363374 A1* | 12/2015 | Lees | ................ | G06Q 10/10 |
| | | | | 715/256 |
| 2018/0004767 A1* | 1/2018 | Lamanna | ................ | H04L 67/10 |
| 2019/0095189 A1* | 3/2019 | Feigen | ................ | G06F 9/44505 |

OTHER PUBLICATIONS

H. Lee and G. C. Fox, "Efficient Software Defined Systems Using Common Core Connponents," 2017 IEEE 10th International Conference on Cloud Computing (CLOUD), Honolulu, CA, 2017, pp. 407-414. URL: http://ieeexplore.ieee.org/stamp/stamp.jsp?tp=&arnumber=8030615&isnumber=8030554 (Year: 2017).*

I. Savga, M. Rudolf, J. Sliwerski, J. Lehmann and H. Wendel, "API Changes—How FarWould You Go?," 11th European Conference on Software Maintenance and Reengineering (CSMR'07), Amsterdam, 2007, pp. 329-330. URL: http://ieeexplore.ieee.org/stamp/stamp.jsp?tp=&arnumber=4145053&isnumber=4145008 (Year: 2007).*

* cited by examiner

US 10,606,585 B1

COMPUTER-BASED SYSTEMS CONFIGURED FOR AUTOMATED ROLL-FORWARD OF SOFTWARE PACKAGE VERSIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based platforms/systems, improved computing devices/components and/or improved computing objects configured for one or more novel technological applications of automated roll-forward of software package versions, including automatic deployment of changes to generate of a new software version.

BACKGROUND OF TECHNOLOGY

A computer network and/or system may include a group of computers (e.g., clients, servers, smart routers) and other computing hardware devices that are linked together through one or more communication channels to facilitate communication and/or resource-sharing, via one or more specifically programmed graphical user interfaces (GUIs), among a wide range of users.

When a network or system, configured with data files and/or software programs and services, experiences outages, errors and failures, an administrator must analyze the failure to make changes to the software and deploy a new version. In the meantime, the software may be rolled back to a snapshot of a previous release or previous version.

SUMMARY OF DESCRIBED SUBJECT MATTER

In some embodiments, the present disclosure provides an exemplary technically improved computer-based method that includes at least the following steps of detecting, by at least one processor, a failure in a software package. Loading, by the at least one processor, a roll-forward library including a set of software package programming interfaces (APIs) associated with a version control system. Executing, by the at least one processor, an extraction API from the roll-forward library to extract software package data indicative of a current software package version from a release directory. Executing, by the at least one processor, a clone API from the roll-forward library to clone a base repository associated with the software package into a temporary directory in response to the software package data, where the base repository includes a version history of the software package. Executing, by the at least one processor, an import API from the roll-forward library to import a prior set of changes from the base repository in the temporary directory into a release directory in response to the cloning of the base repository, where the prior set of changes form an old software package version of the software package relative to the current software package version of the software package at a time of the failure. Executing, by the at least one processor, a commit API from the roll-forward library to overwrite current software package version with the prior set of changes in the release directory to generate a new software package version of the software package. Executing, by the at least one processor, a push API from the roll-forward library to push the new software package version of the software package directly to the base repository. Executing, by the at least one processor, a deployment API to cause the new software package version of the software package to replace the current software package version of the software package.

In some embodiments, the present disclosure provides an exemplary technically improved computer-based method that includes at least the following steps of detecting, by at least one processor, a failure in a software package. Executing, by the at least one processor, a roll-forward process associated with a version control system to generate a new software package version of the software package by replacing a current software package version of the software package with a prior set of changes to the software package, where the roll-forward process includes: an extraction API from the roll-forward library to extract software package data indicative of the current software package version from a release directory, a clone API from the roll-forward library to clone a base repository associated with the software package into a temporary directory in response to the software package data where the base repository includes a version history of the software package, an import API from the roll-forward library to import the prior set of changes from the base repository in the temporary directory into a release directory in response to the cloning of the base repository where the prior set of changes form an old software package version of the software package relative to the current software package version of the software package at a time of the failure, a commit API from the roll-forward library to overwrite current software package version with the prior set of changes in the release directory to generate a new software package version of the software package, and a push API from the roll-forward library to push the new software package version of the software package directly to the base repository. A deployment API to cause the new software package version of the software package to replace the current version of the software package.

In some embodiments, the present disclosure provides an exemplary technically improved computer-based system that includes at least the following components of at least one version control database configured to store a temporary directory, and at least one processor configured to perform a roll-forward process associated with a version control system to generate a new software package version of the software package by replacing a current software package version of the software package with a prior set of changes to the software package, where the roll-forward process includes instructions that cause the at least one processor to execute the steps including: detecting a failure in a software package; loading a roll-forward library including a set of software package programming interfaces (APIs) associated with the version control system; executing an extraction API from the roll-forward library to extract software package data indicative of the current software package version from a release directory; executing a clone API from the roll-forward library to clone a base repository associated with the software package into the temporary directory in response to the software package data; where the base repository includes a version history of the software package; executing an import API from the roll-forward library to import the prior set of changes from the base repository in the temporary directory into a release directory in response to the cloning of the base repository; where the prior set of changes form an old software package version of the software package relative to the current software package version of the software package at a time of the failure; executing a commit API from the roll-forward library to overwrite current software package version with the prior set of changes in the release directory to generate the new software package version of the software package; executing a push API from the roll-forward library to push the new software package version of the software package directly to the base repository; and executing a deployment API to cause the new software package version of the software package to replace the current software package version of the software package.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
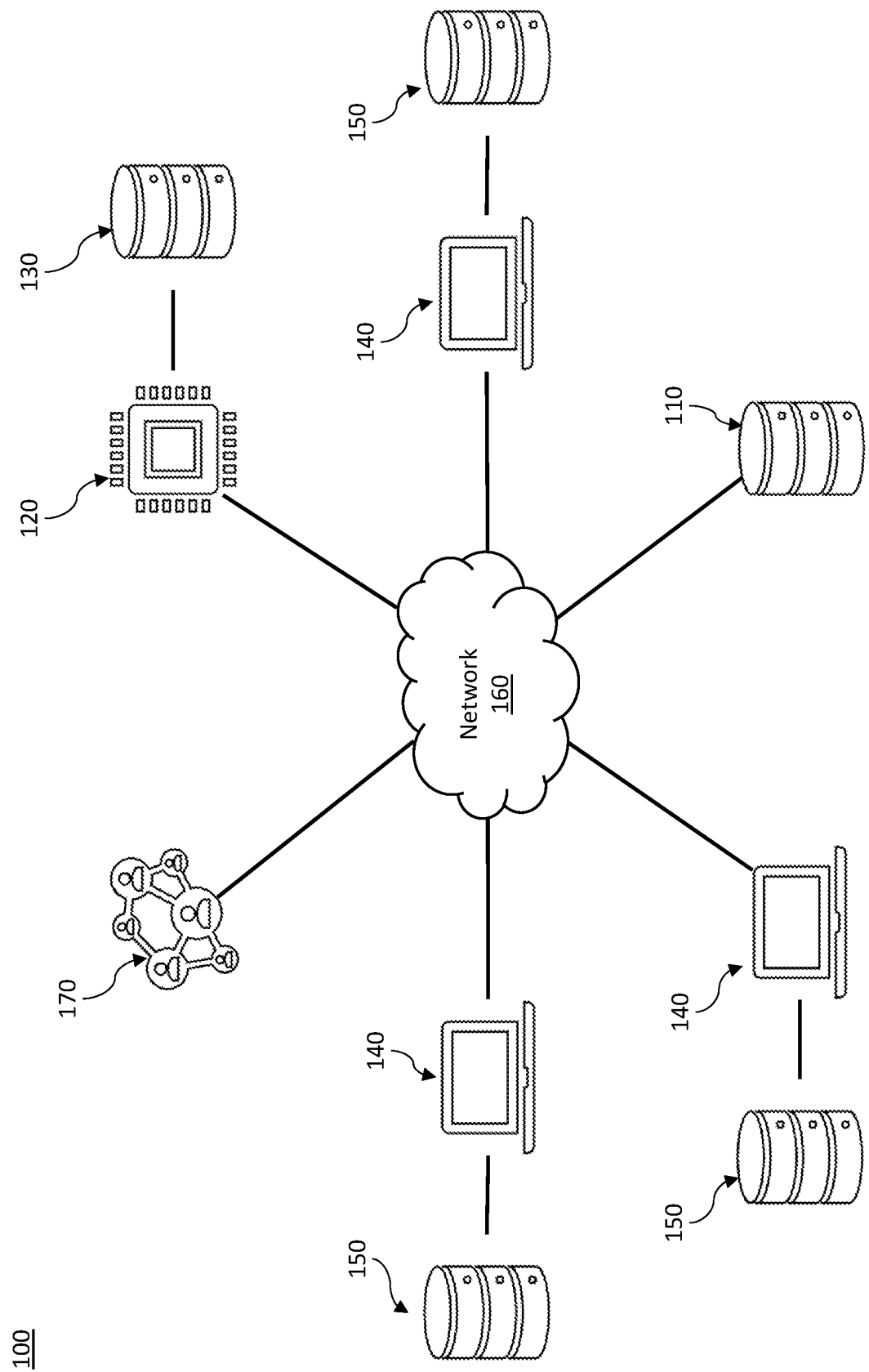
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

As used herein, the terms "computer system," "computer-related system" and "system" identify any combination of software and/or hardware.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeB SD, NetB SD, OpenB SD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIGS. 1 through 8 illustrate systems and methods of automated failure remediation through roll-forward updates. The following embodiments provide technical solutions and/or technical improvements that overcome technical problems, drawbacks and/or deficiencies in the technical fields involving detecting and fixing errors and failures in software in systems and networks. As explained in more detail, below, technical solutions and/or technical improvements herein include aspects of improved automated detection of failures, identification of stable software versions, repackaging of data associated with the stable version to form a new version, and automated deployment of the new version to update the software to fix the failure. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of another exemplary computer-based system for roll-forward enabled version control in accordance with one or more embodiments of the present disclosure.

In some embodiments, a roll-forward enabled versioning system (REV) system 100 may include a main, or base, repository 110. Herein, the term "roll-forward" refers to automated version updating or upgrading to one or more software packages to produce a software package having a higher version number. In some embodiments, the base repository 110 may deploy, e.g., applications, services, programs, security features and policies, security and/or networking configurations, and other software related features to a user-base 170 via a network 160. In some embodiments, the base repository 110 may include a storage solution for maintaining and deploying software packages, such as a current version of each software package, a record of previous versions of each software package along with a history of changes and/or fixes to of each software package, and associated metadata, among other features related to the software packages. In some embodiments, such storage solutions may include, e.g., a distributed repository across multiple user computing devices 140, a storage device, a network of storage devices, a server, a network of servers, a cloud storage platform, or other combination of storage and processing hardware, and combinations thereof.

In some embodiments, the network 160 may include, e.g., a suitable network for connected the user-base 170 with the base repository 110, as well as with one or more user computing devices 140. In some embodiments, such a network 160 may include, e.g., a private intranet, an internet, a distributed network, a local wireless network, a local area network (LAN), a local wired network, an ad-hoc network, direct connections via, e.g., wired or wireless communication, or any other suitable network 170 and combinations thereof. In some embodiments, the network 160 includes a distribution network for distributing software packages, such as, e.g., an application store, a torrent network, or other distribution network.

In some embodiments, user computing devices 140 of the REV system 100 may engage with the software packages maintained in the base repository 110. For example, in some embodiments, a user, such as a developer, programmer, administrator, or combinations thereof, may access selected software packages in the base repository 110 via a suitable graphical user interface (GUI) on the user computing device 140. In some embodiments, the user may, with appropriate permissions, such as, e.g., a password protected account or other protected account, make modifications to the selected software package, such as, e.g., by adding features, fixing bugs, updating policies, or other modifications.

In some embodiments, the user modifies a software package by commit changes via new and/or modified files pertaining to the software package. Thus, the user may enter changes into a respective user computing device 140. The changes may then be committed to the software package in the base repository 110.

In some embodiments, the user may access the software package by using the user computing device 140 to issue a pull request for the software package to pull the software package from the base repository 110 across the network 160 and store a copy or clone of the base repository on a user storage 150 associated with the user computing device 140. In some embodiments, the pull request includes a check-out function that checks the software package out of the base repository 110. Here, the check-out function lists the pulled package and/or associated files as in use by a user, and protects the pulled package and/or associated files so that a user other than user that checked the package out may not modify the software package.

In some embodiments, upon completing the changes, the user at the user computing device 140 may commit the changes to the associated file of the software package with, e.g., a push request. In some embodiments, the push request may upload the modified files with the changes to the base repository 110 via the network 160 to check the software package back in to the base repository 110. In some embodiments, the push request replaces the original files of the software package with the changed files to include the changes in an updated version of the software package. However, in some embodiments, rather than overwriting the software package, the base repository 110 may re-save the software package as a new version containing the committed changes while the original software package remains unchanged as an old version. In some embodiments, the base repository 110 may maintain a record of each version of the software package, including the associated files and changes.

In some embodiments, multiple user computing devices 140 may clone a software package to the respective user storages 150. Upon pushing respective changes to the base repository 110, the base repository 110 may recognize the changes as being modifications to a common version of the software package. In some embodiments, the base repository 110 may merge changes committed to a common version by tracking and keeping all changes pushed from each user computing device 140 to create a new version from the aggregate of committed changes.

In some embodiments, when changes are committed to a software package and a new version is a created, one or more user computing devices 140 may instruct the base repository 110 to deploy the new version of the software package to the user-base 170 via the network 160. In some embodiments, deployment may, e.g., publish the entirety of the software package as a new version, however, in some embodiments, deployment may include publishing changed portions of the software package to replace the corresponding portions of the previously released version of the software package in the user-base 170, thus reducing memory, processing, and communication resources to update the software package for the user-base 170.

However, in some embodiments, committed changes to a software package may cause unintended errors. For example, changes to an application may interact with, e.g., an operating system, a device, a kernel, other applications, security policies, or other portions of the installing system, in unforeseen ways that cause a failure to operation of the application or to the installing system on a whole. Similarly, in another example, changes to security policies may have unintended and unforeseen interactions with software running on a device or multiple devices in a system or network, such as a cloud storage platform, datacenter network, local area network, or other system or network. As a result, the committed changes may cause errors that take a large amount of time to debug and fix with additional changes.

Accordingly, in some embodiments, the REV system 100 may include a roll-forward system 120 to generate a new version of the software package to quickly update and deploy the software version with known working changes. For example, in some embodiments, the roll-forward system 120 may automatically access the base repository 110 to issue a pull request for the software package. The pull request may pull the software package across the network 160 and store a copy or clone of the base repository on a roll-forward storage 130 associated with the roll-forward system 120. In some embodiments, the pull request includes a check-out function that checks the software package out of the base repository 110. Here, the check-out function lists the pulled package and/or associated files as in use by a user, and protects the pulled package and/or associated files so that a user other than user that checked the package out may not modify the software package.

In some embodiments, to automatically fix the errors discovered in the current version of the software package, the roll-forward system 120 may extract or import changes associated with a last known stable version of the software package, e.g., using an index of versions and an, e.g., import API. In some embodiments, the import API may automatically trigger, e.g., a commit API to cause the roll-forward system 120 to automatically commit the imported changes to a new software package version. In some embodiments, this commit may automatically trigger, e.g., a push API to cause the roll-forward system 120 to automatically push the new software package version based on the last known stable changes to the software package version to, e.g., a master branch of the base repository 110. Thus, in some embodiments, the push returns the software package as a new version based on old changes to the base repository 110. This return may trigger an automatic deployment, via, e.g., a deployment API, to deploy the new version to the user-base 170. Accordingly, a new stable version of the software package can automatically be pushed and deployed based on previous stable changes, independent of other development without resorting to falling back to a previous release.

Figure 2:
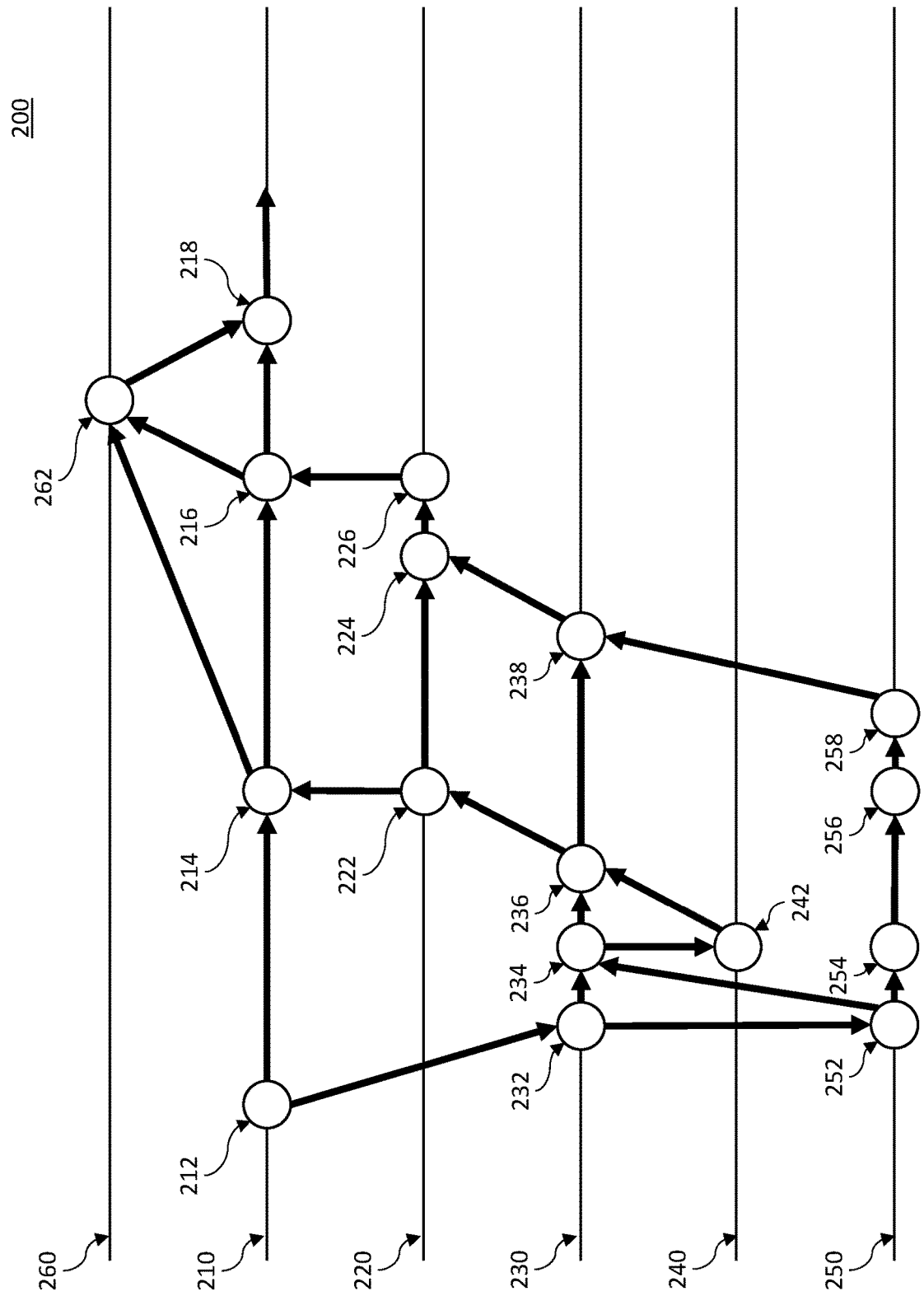

FIG. 2 is a diagram of another exemplary computer-based system with roll-forward enabled version control in accordance with one or more embodiments of the present disclosure.

In some embodiments, a REV system, such as the REV system 100 described above, may include multiple branches for tracking and implementing changes to a software package. In some embodiments, finalized changes may be deployed in a full software package on a master branch 210 copy of the software package. In some embodiments, the master branch 210 stores the full version of a software package that is deployed and distributed by, e.g., a base repository 110 or other storage system. As such, in some embodiments, the master branch 210 holds the master copy of the software package for use by end users, e.g., in the user-base 170.

In some embodiments, the master branch 210 may include a software package version (1) 212 that includes a complete set of, e.g., files, commits, data, etc. for executing the software package. In some embodiments, development of the software package is ongoing with the aim of updating the software package version (1) 212 to a software package version (2) 214. However, the deployed software package version (1) 212 that is available for distribution by the user-base may not be alterable on the master branch 210, lest a user in the user-base access the software package version (1) 212 prior to a change or development being completed.

Thus, in some embodiments, a developer or programmer or other development personnel may check-out the software package version (1) 212 by, e.g., cloning the software package version (1) 212 on the master branch 210 to a development branch 230 to create a development version (1) 232. In some embodiments, the development branch 230 is independent form the master branch 210 such that any changes on the development branch 230 to the development version (1) 232 does not affect the deployed master version of software package version (1) 212 on the master branch 210. In some embodiments, the development branch 230 includes, e.g., a file set of an in-development software package (e.g., an update to the software package version (1) 212 or other software package). The development branch 230 may be accessible to only one developer at an associated user device, or to all developers working on the software package, or some subset of developers greater than one.

Accordingly, in some embodiments, a developer or other user, may develop features on a first feature branch 240, second feature branch 250, or other feature branch by, e.g., checking out the development version (1) from the development branch 230 to a respective feature branch 140 or 250. In some embodiments, each feature branch, including the first feature branch 240 and the second feature branch 250 may be permissioned to allow a subset of developers assigned to a particular feature of the software package to modify the files of a feature. For example, developers assigned to a second feature version (1) 252 on the second feature branch 250 may have access to the files of the second feature that constitute the second feature version (1) 252. In some embodiments, the second feature developers may make changes to the second feature version (1) 252 to create a second feature version (2) 254 based on the development version (1) 232. Similar to the development branch 230, each feature branch 240/250 may be independent from other branches in the REV system such that changes on that branch do not affect the files of other branches.

In some embodiments, the second feature version (1) 252 can include changes relative to the development version (1) 232. Such changes may be, e.g., specific to a particular feature to be added or modified in the development version (1) 232. As with the development branch 230, the first feature branch 240 and the second feature branch 250 may each be permissioned to allow, e.g., an individual developer, a group of assigned developers, all developers, or some other grouping of users.

In some embodiments, a developer may check-out the development version (1) 232 to work on changes to the second feature version (1) 252. Upon completing the changes, the developer may commit the changes to form second feature version (2) 254 and merge the features back into the development branch to form development version (2) 234 and second feature version (2) 254. In some embodiments, the second feature version (2) 254 may undergo further development on the second feature branch 250 to add, remove and/or modify portions of the feature of software package to create a second feature version (3) 256, second feature version (4) 258, and/or additional second feature versions.

Similarly, in some embodiments, the development version (2) 234 may undergo further development. For example, the development version (2) 234 may be checked-out to a first feature branch 240 for addition, removal and/or modifications to portions of a first feature to form a first feature version (1) 242. As with the feature versions of the second feature branch 250, the first feature version (1) 242 may have changes committed and merged back into the development branch 230 to produce a development version (3) 236 with the feature changes of the first feature version (1) 242. Development of the development version (3) 236 may continue, including, e.g., bug fixes or other changes on the development branch 230, including commits of changes from other feature branches, hotfix branches, debug branches, or other branches merged back into the development branch 230 to produce, e.g., a development version (4) 238. In some embodiments, the development version (4) 238 may include the commits from the changes in the second feature branch 250 as committed to, e.g., the second feature version (4) 258.

In some embodiments, the changes to the development version (3) 236 may also be merged into a release branch 220 to produce a release candidate version (1) 222 of the software package (e.g., a beta version (1), or other pre-release version). In some embodiments, the release candidate version (1) 222 may be tested and merged into the master branch 210 to produce the software package version (2) 214. However, the release candidate version (1) 222 may also undergo further development, e.g., by merging changes from the development version (4) 238 to produce release candidate version (2) 224.

In some embodiments, the release candidate version (2) 224 may undergo development such as debugging and hotfixes to produce, e.g., release candidate version (3) 226. In some embodiments, the release candidate version (3) 226 may be determined to be stable enough for public release, at which point the changes contained therein may be merged into the master branch 210 to produce the software package version (3) 216. Software package version (3) 216 may, therefore, include the changes committed to the second feature version (4) 258, the first feature version (2) 242, the development version (4) 238 and the release candidate version (3) 226 merged into the software package.

However, sometimes, even with extensive testing, changes to a software package may cause errors, failures, outages or other unforeseen issues when the associated changes are merged into the master branch 210 for public deployment to, e.g., the user base. To quickly and efficiently remedy issues such as outages, failures and errors affecting the user base, the software package version (3) 216 may be automatically rolled-forward upon detection of the issues to produce a stable software package version (4) 218. To facilitate the automatic roll-forward, the master branch 210 software package may be checked-out to a roll-forward branch 260 by, e.g., an automated roll-forward engine or system.

In some embodiments, the roll-forward branch 260 may produce a roll-forward version (2) 62 by checking-out the master branch 210 software package, including the software package version (2) 214 or other last known stable version of the software package, and, in some embodiments, the software package version (3) 216 using, e.g., a clone API to clone the base repository to a roll-forward storage. In some embodiments, the roll-forward version (2) 62 may be formed from the set of changes corresponding to the software version (2) 214, which, in this example, is a known stable version. In some embodiments, where the software package version (2) 214 also caused outages or other failures in the user-base, the roll-forward branch 260 may extract an older version, such as the software package version (1) 212 or older. Thus, upon detection of an outage or other failure, the software package from the master branch 210 may be cloned to the roll-forward branch 260, and the previous stable changes associated with a last known stable software package version may be extracted.

In some embodiments, upon extracting the previous stable changes, the roll-forward branch 260 may recommit the changes to the roll-forward version (2) 62 of the software package, e.g., via a commit API. Upon committing the changes, the roll-forward branch 262 may automatically push the changes to a new software package version, e.g., software package version (4) 218 via, e.g., a push API, and deploy the new version on the master branch 210. In some embodiments, the roll-forward branch 260 operates independent of developer activities on the release branch 220, development branch 230, or feature branches 240 and 250. Rather, in some embodiments, development on the roll-forward branch 260 is dedicated to the automated roll-forward process implemented by, e.g., the roll-forward system or engine, such as the roll-forward system 120 described above. Accordingly, in some embodiments, permissioning of the roll-forward branch 260 may be limited to administrative user to, e.g., set preferences, set APIs, and otherwise configure the roll-forward branch 260. Accordingly, a new stable version of the software package can automatically be pushed and deployed on the master branch 210 based on previous stable changes, independent of other development without resorting to falling back to a previous release.

Figure 3:
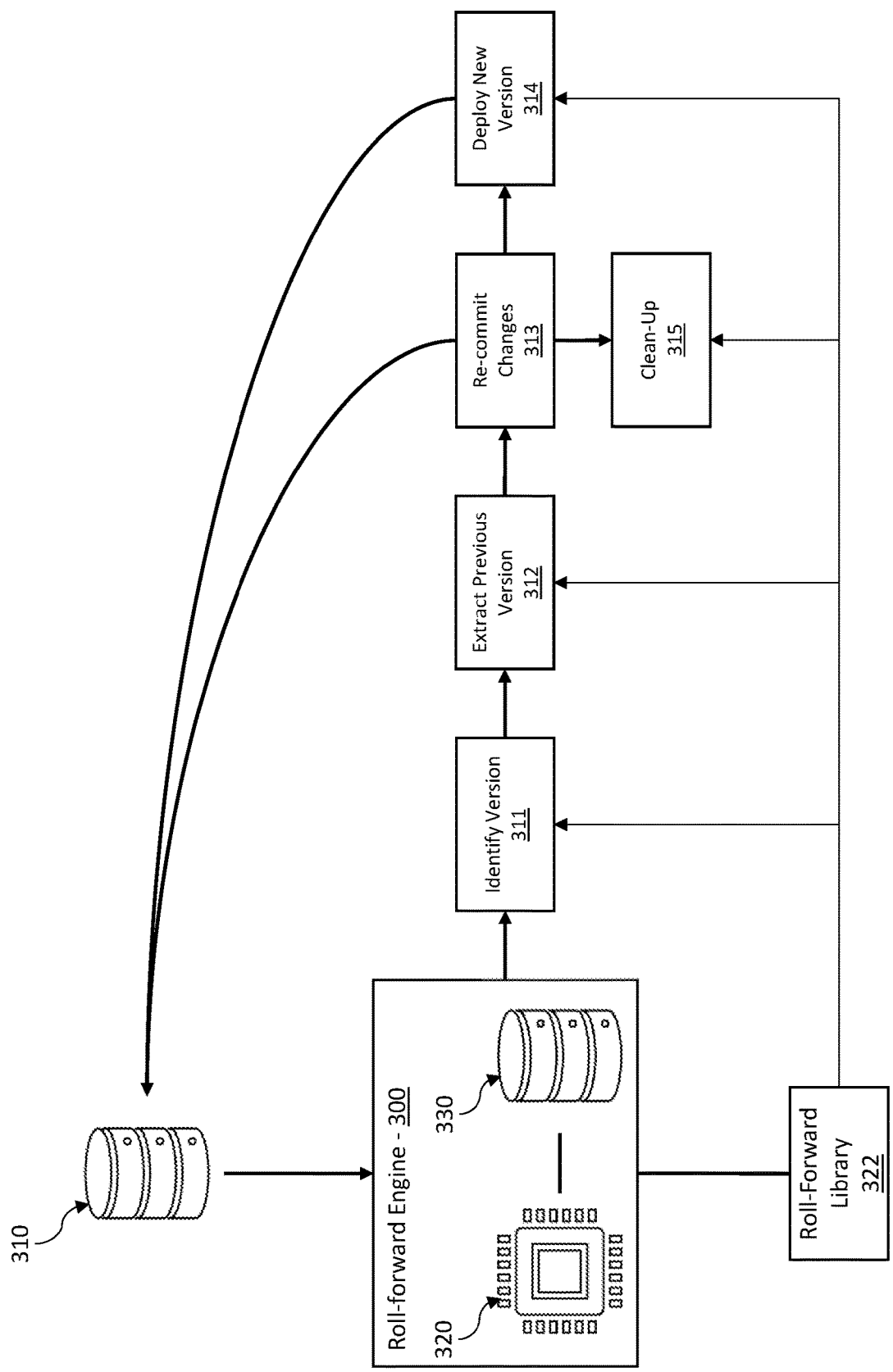

FIG. 3 is a block diagram of another exemplary computer-based system roll-forward enabled version control in accordance with one or more embodiments of the present disclosure.

In some embodiments, a roll-forward engine 300 may include a roll-forward processing system 320 and a roll-forward storage system 330 in communication, e.g., via a network, with a base repository 310. In some embodiments, the base repository 310 includes a repository of files associated with a software package, including previous versions of the software package and current, deployed version of the software package. In some embodiments, the software package may include, e.g., applications, services, programs, security features and policies, security and/or networking configurations, and other software related features, including files, libraries, APIs and other software package components.

In some embodiments, an existing software package is deployed to a user-base or system. However, sometimes tested and deployed software packages result in failures or outages in systems and/or devices. In some embodiments, where the deployed software package causes or otherwise experiences a failure or outage, the roll-forward processing system 320 of the roll-forward engine 300 may detect the failure by, e.g., notification by a user, failure detection system, by monitoring the software package error reports and telemetry, among others and combinations thereof. In some embodiments, upon detection of the failure and/or outage, the roll-forward engine 300 may initiate an automated roll-forward process including, e.g., loading a roll-forward library 322 including instructions and APIs for implementing the roll-forward process in an automated fashion. In some embodiments, the roll-forward library 322 is maintained in the roll-forward storage 330, or any other suitable storage device or storage location in communication with the roll-forward engine 300.

In some embodiments, the roll-forward engine 300 may instantiate the roll-forward process on the roll-forward processing system 320 implementing the roll-forward library 322. In some embodiments, the detection of the failure may trigger cloning of the base repository 310 into the roll-forward storage 330 using, e.g., a clone API in the roll-forward library 322. In some embodiments, the clone API may cause the base repository 310 to be cloned onto the roll-forward storage 330. As a result, the repository holding files for versions of the software package may be accessible to the roll-forward processing system 320.

In some embodiments, receiving the cloned repository by the roll-forward storage 330 may trigger may automatically trigger the roll-forward processing system 320 to initiate, e.g., a version identification process at block 311, via, e.g., a version history API or other API or function. For example, the roll-forward processing system 311 may call a version identification function from the roll-forward library 322 in response to the cloning of the repository. In some embodiments, the version identification function may include, e.g., analyzing a table recording a version history, including a file and change history of the software package, and identifying records associated with a version preceding the currently deployed version of the software package. As a result, in some embodiments, a version or set of files and/or changes may be identified by the roll-forward processing system 320

In some embodiments, identification of the preceding version of the software package may automatically trigger may automatically trigger the roll-forward processing system 320 to issue pull request via, e.g., a pull API in the roll-forward library 322, to extract the files and changes associated with the preceding version at block 312. In some embodiments, the pull API causes the preceding version of the software package to be checked-out of a master branch and into, e.g., a roll-forward branch. As a result, operations to the files of the preceding version may be performed without affected the master branch until all of the changes are committed. Thus, in some embodiments, development of a roll-forward version may be isolated from the master branch to prevent corrupting the version and associated files already committed to the master branch.

In some embodiments, extraction of the files associated with the preceding version of the software package may automatically trigger the roll-forward processing system 320 to issue push request via, e.g., a commit or push API in the roll-forward library 322 to re-commit changes from the preceding version to the master branch at block 313. In some embodiments, the commit API may automatically aggregate the changes from the preceding version to create a new software package version built from past changes. Thus, in some embodiments, the roll-forward engine 300 may utilize a library of roll-forward APIs and functions in the roll-forward library 322 to build a new software package version that is stable and secure. In some embodiments, each function and API triggers a subsequent function and/or API to commit a new roll-forward version directly to a master branch in the base repository 310 for deployment.

Upon committing the preceding version changes, the roll-forward processing system 320 may automatically trigger a clean-up process at block 315 and a deployment process at block 314. In some embodiments, the deployment process may be automatically triggered at block 314 by, e.g., a deployment request via a deployment API in the roll-forward library 322. In some embodiments, the deployment request causes the roll-forward version of the software package on the master branch in the base repository 310 to be deployed and published to, e.g., a user-base, system, network, datacenter, or other computing device or group of computing devices.

However, in some embodiments, to avoid the roll-forward storage 330 from being filled, the clean-up process at block 315 may clean-up the cloned files in the roll-forward storage 330. As a result, in some embodiments, the clean-up process may cause the roll-forward processing system 320 to search the roll-forward storage 330 for files associated with the software package. Upon discovering and identifying files associated with the software package, the roll-forward processing system 320 may remove the files associated with the software package from the roll-forward storage 330. Accordingly, in some embodiments, the roll-forward engine 300 may be cleaned to conserve resources in preparation for the possibility of another failure.

Figure 4:
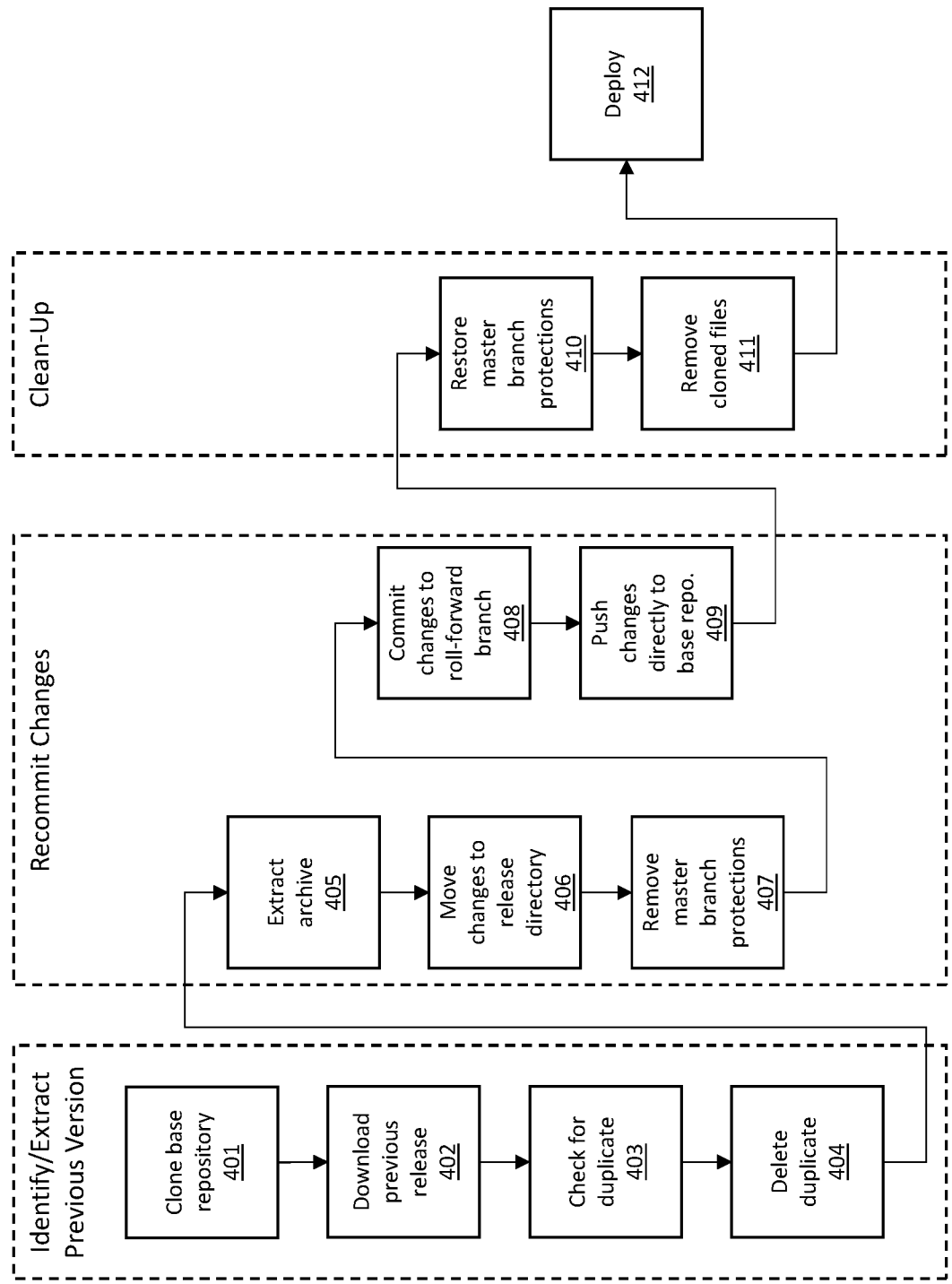

FIG. 4 illustrates a flowchart of an exemplary inventive methodology roll-forward enabled version control in accordance with one or more embodiments of the present disclosure.

In some embodiments, a software package may cause a failure in, e.g., a cloud platform. In some embodiments, the software package may include, e.g., security configurations, cloud orchestration configurations, an application, program and/or service, among other software and combinations thereof. Where the software package fails or causes an outage, quick and efficient recovery facilitates a decrease in downtime and improvements in user experience, reduction in costs caused by an outage or failure, among other benefits. Accordingly, a roll-forward system may implement an automatic roll-forward process to quickly and efficiently respond to failures and outages in the cloud platform to facilitate greater uptime and fault-tolerance.

In some embodiments, the roll-forward system may clone a base repository associated with the software package at block 401. In some embodiments, block 401 may clone the base repository to a local storage device or storage system of the roll-forward system using, e.g., a temporary directory. Accordingly, the files of the cloned repository may be manipulated independent of the files in the base repository, including deployed files and packages for a previous release of the software package. In some embodiments, the previous release has been previously deployed and is known to be stable.

In some embodiments, the roll-forward system may download the previous release of the software package at block 402. As such, the roll-forward system downloads a stable version of the software package automatically in response to the cloning of the base repository. In some embodiments, the previous release is downloaded to the temporary directory for use and manipulation by the roll-forward system separate from the master branch on the base repository, e.g., in a roll-forward branch.

In some embodiments, the roll-forward system may check for duplicate files at block 403 to ensure only appropriate files are used. In some embodiments, where duplicate files are found, the roll-forward system may automatically delete duplicates at block 404. For example, in some embodiments, the roll-forward system may compare each file in the previous release with each file in the temporary directory. Where matches between files are found, the matches may trigger a removal or deletion function that automatically erases the duplicate in the temporary directory. Thus, in some embodiments, only one copy of the previous release is maintained in the temporary directory.

In some embodiments, the roll-forward system may extract an archive of files for the previous release maintained in the temporary directory at block 405. In some embodiments, extracting the archive may extract the archive to the temporary directory, creating a folder of changes or other files associated with the previous release of the software package in the temporary directory.

In some embodiments, the roll-forward system may move the folder with the changes or other files from the archive to a release directory at block 406. In some embodiments, the release directory is located within the cloned repository in the local storage. However, in some embodiments, the release directory is in the base repository. In some embodiments, the creation of the folder for the changes or other files due to extraction from the archive automatically triggers the move function to cause the folder to be moved to the release directory by the roll-forward system. In some embodiments, the release directory is associated with a branch other than a master branch for developing the software package. In some embodiments, the release directory corresponds to a release branch, however in other embodiments, it corresponds to a roll-forward branch, among other branches and combinations thereof.

In some embodiments, the roll-forward system may remove the master branch protections at block 407. In response to the moving of the folder to the release directory, the roll-forward may automatically trigger the removal of the master branch protections via, e.g., a protection removal API, such as, e.g., a requests.delete or other API request. The master branch protections facilitate the integrity of the master copy of the software package, which may be used for deployment. Thus, removal of the master branch protections may facilitate committing changes from the roll-forward system to a deployable copy of the software package.

In some embodiments, removal of the master branch protections may include a check for whether the protections have been successfully removed, such as, e.g., by attempting access and receive an allowed or denied status of the attempt. In some embodiments, where the removal is unsuccessful, the removal may be retried, such as, e.g., through an automatic reissue of the API request to remove the master branch protections. In some embodiments, the roll-forward system may automatically retry the removal until access is granted, or until a threshold is reached. In some embodiments, the threshold includes a time-based threshold, such as, e.g., 5 minutes, 10 minutes, 15 minutes, or other threshold to facilitate multiple tries while prevent resource overloads. In some embodiments, the threshold includes an attempt threshold, such as, e.g., 5 attempts, 10 attempts, 25 attempts, 100 attempts, or other threshold to facilitate multiple tries while prevent resource overloads. Where the master branch protections are not successfully removed by the automatic request, an administrator may be notified via, e.g., visual or auditory alert via a computing system including a display and/or speakers, of the failure and that manual assistance is needed.

In some embodiments, upon removal of the master branch protections, the roll-forward system may automatically trigger a commit of the changes to the roll-forward branch including the local previous release at block 408. In some embodiments, committing the changes includes, e.g., packing the changes into a software package associated with a new version of the software package. As a result, the package is automatically build as a version update to the current version of the software package.

In some embodiments, the roll-forward system may push the new software package may be directly to the base repository at block 409 to implement the changes on the master branch in the base repository. In some embodiments, the push may be implemented with a push request via, e.g., a push API. In some embodiments, pushing the new software package with the changes from the previous release results a new version indication in the master branch for the new software package to replace the current version of the software package.

In some embodiments, the roll-forward system may restore the master branch protections at block 410 in response to the push of the changes to the master branch. In some embodiments, the restoral of master branch protections may be executed by automatically triggering, e.g., a protection restoral API, such as, e.g., a requests.put or other API request. The master branch protections facilitate the integrity of the master copy of the software package, which may be used for deployment. Thus, removal of the master branch protections may facilitate committing changes from the roll-forward system to a deployable copy of the software package.

In some embodiments, restoral of the master branch protections may include a check for whether the protections are successfully in place, such as, e.g., by attempting access and receive an allowed or denied status of the attempt. In some embodiments, where the restoral is unsuccessful, the restoral may be retried, such as, e.g., through an automatic reissue of the API request to restore the master branch protections. In some embodiments, the roll-forward system may automatically retry the restoral until access is denied, or until a threshold is reached. In some embodiments, the threshold includes a time-based threshold, such as, e.g., 5 minutes, 10 minutes, 15 minutes, or other threshold to facilitate multiple tries while prevent resource overloads. In some embodiments, the threshold includes an attempt threshold, such as, e.g., 5 attempts, 10 attempts, 25 attempts, 100 attempts, or other threshold to facilitate multiple tries while prevent resource overloads. Where the master branch protections are not successfully restored by the automatic request, an administrator may be notified via, e.g., visual or auditory alert via a computing system including a display and/or speakers, of the failure and that manual assistance is needed.

In some embodiments, upon successful restoral of the master branch protections in the base repository, the roll-forward system may automatically initiate clean up to remove all local files form the temporary directory in the local storage at block 411. Accordingly, in some embodiments, the roll-forward system may search the temporary directory for files and delete any and all files discovered in the temporary directory. In some embodiments, the temporary directory itself is deleted to remove all files maintained therein. Thus, the local storage may be reused for, e.g., a later roll-forward process, reallocation to other uses, or other suitable uses. Moreover, deleting the files in the temporary directory prevents resource overuse by deleting unnecessary files.

In some embodiments, upon completing the clean-up of the temporary directory, the roll-forward system may deploy the roll-forward version at block 412 to the cloud platform. In some embodiments, the roll-forward system deploys the new software package by, e.g., automatically triggering a deployment API in response to the completion of the temporary directory clean-up. In some embodiments, invoking the deployment API may cause the base repository and the master branch to publish the new software package to the cloud platform to replace the current version of the software package, thus updating the software package of the cloud platform to a stable release based on previous changes that are known to be stable.

Figure 5:
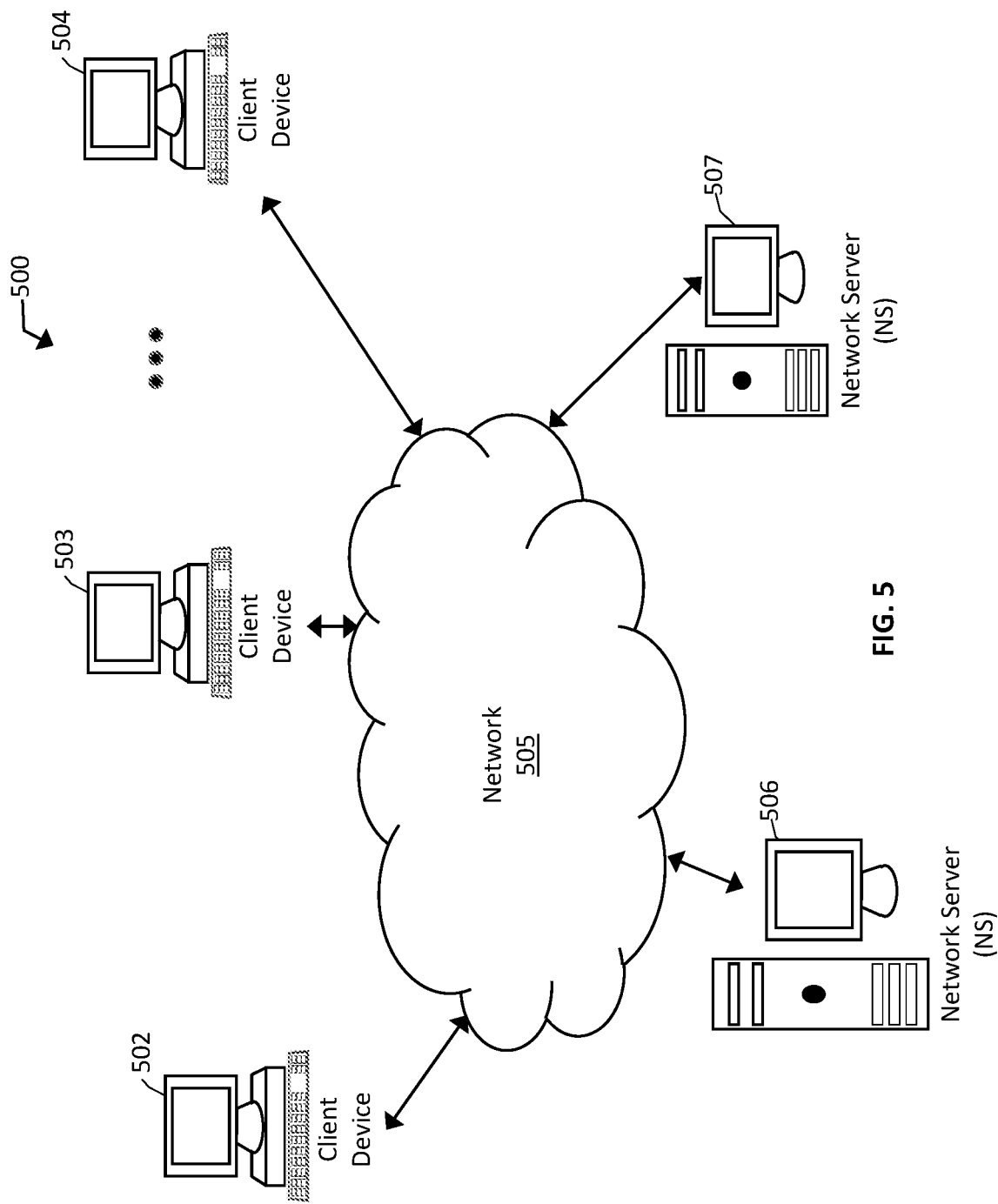

FIG. 5 depicts a block diagram of an exemplary computer-based system 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system 500 may be configured to manage a large number of members and/or concurrent transactions, as detailed herein. In some embodiments, the exemplary computer-based system 500 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
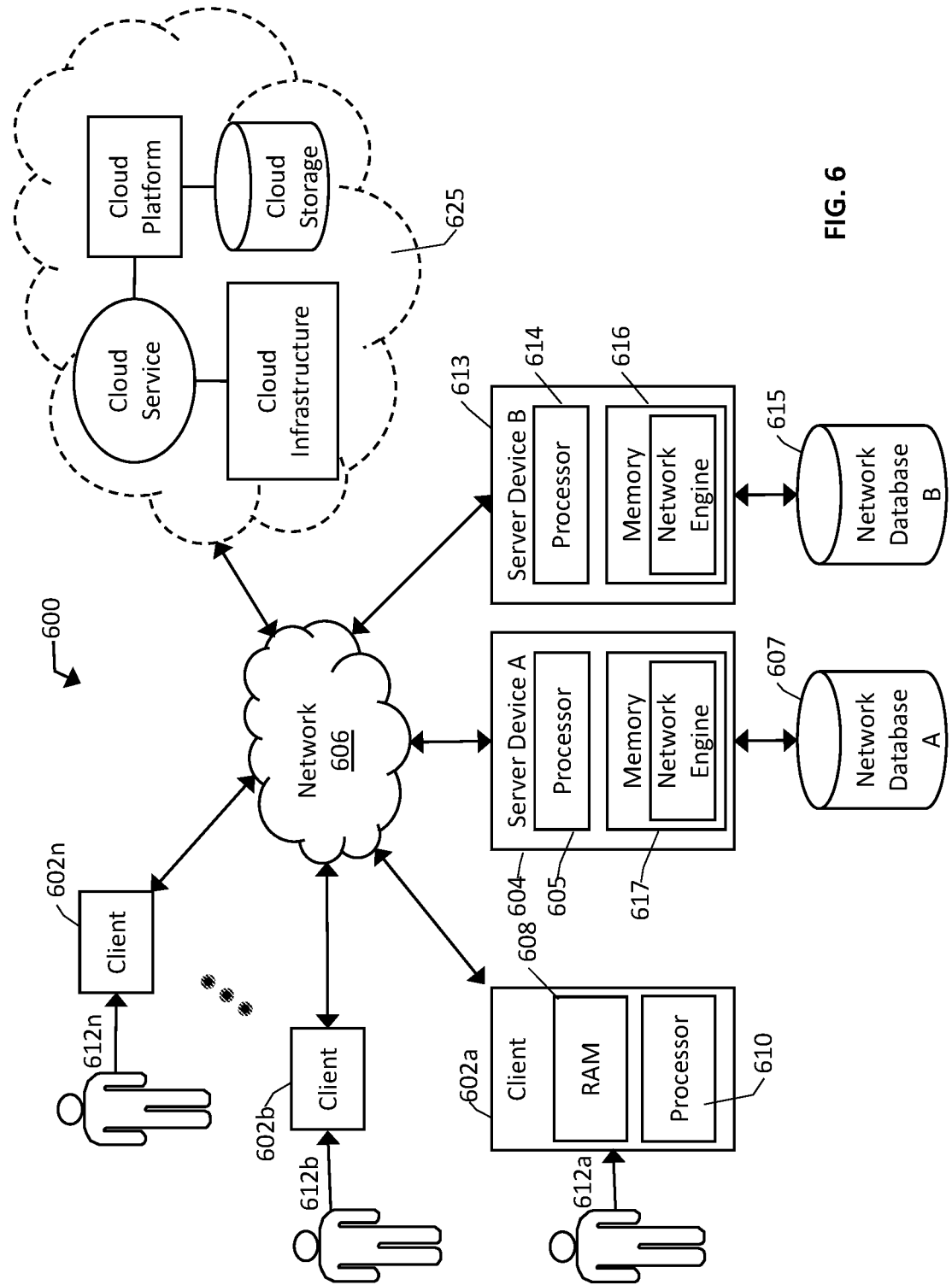

FIG. 6 depicts a block diagram of another exemplary computer-based system 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602*a* through 602*n* may also comprise a number of external or internal devices such as a mouse, a CD-ROM, DVD, a physical or virtual keyboard, a display, a speaker, or other input or output devices. In some embodiments, examples of member computing devices 602*a* through 602*n* (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602*a* through 602*n* may be specifically programmed with one or more application programs in accordance with one or more principles/methodologies detailed herein. In some embodiments, member computing devices 602*a* through 602*n* may operate on any operating system capable of supporting a browser or browser-enabled application, such as Microsoft™ Windows™, and/or Linux. In some embodiments, member computing devices 602*a* through 602*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602*a* through 602*n*, users, 612*a* through 602*n*, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602*a* through 602*n* may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
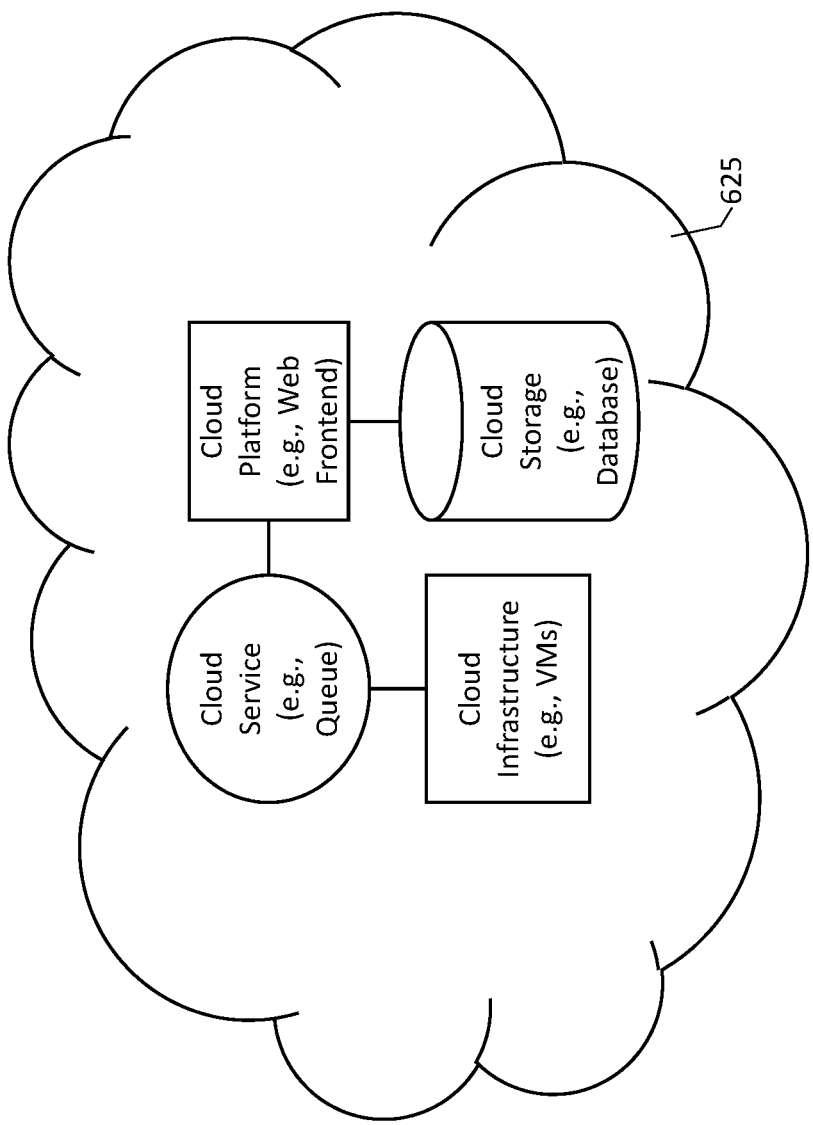
Figure 8:
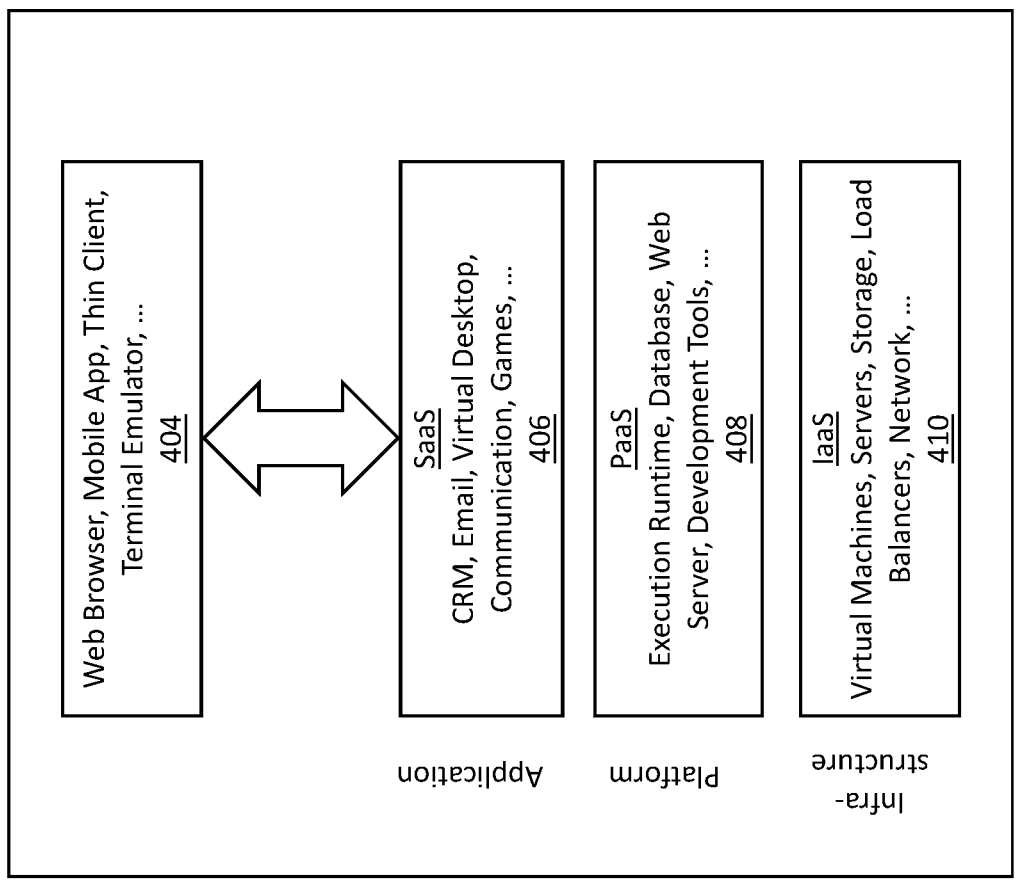

In some embodiments, the exemplary inventive computer-based systems, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the exemplary inventive computer-based systems, the exemplary inventive computer-based devices, and/or the exemplary inventive computer-based components of the present disclosure may be specifically configured to operate.

At least some aspects of the present disclosure will now be described with reference to the following numbered clauses.

1. A method comprising:
   detecting, by at least one processor, a failure in a software package;
   loading, by the at least one processor, a roll-forward library comprising a set of software package programming interfaces (APIs) associated with a version control system;
   executing, by the at least one processor, an extraction API from the roll-forward library to extract software package data indicative of a current software package version from a release directory;
   executing, by the at least one processor, a clone API from the roll-forward library to clone a base repository associated with the software package into a temporary directory in response to the software package data;
     wherein the base repository comprises a version history of the software package;
   executing, by the at least one processor, an import API from the roll-forward library to import a prior set of changes from the base repository in the temporary directory into a release directory in response to the cloning of the base repository;
     wherein the prior set of changes form an old software package version of the software package relative to the current software package version of the software package at a time of the failure;
   executing, by the at least one processor, a commit API from the roll-forward library to overwrite current software package version with the prior set of changes in the release directory to generate a new software package version of the software package;
   executing, by the at least one processor, a push API from the roll-forward library to push the new software package version of the software package directly to the base repository; and
   executing, by the at least one processor, a deployment API to cause the new software package version of the software package to replace the current software package version of the software package.

2. The method of clause 1, further comprising executing, by the at least one processor, a delete request API from the roll-forward library to remove master branch protections from the base repository in response to the importing of the prior set of changes from the base repository.

3. The method of clause 2, further comprising testing, by the at least one processor, access to the base repository to confirm the removal of the master branch protections.

4. The method of clause 2, further comprising executing, by the at least one processor, a put request API from the roll-forward library to restore master branch protections to the base repository in response to the overwrite of the current software package version with the prior set of changes in the release directory.

5. The method of clause 4, further comprising testing, by the at least one processor, access to the base repository to confirm the restoral of the master branch protections.

6. The method of clause 1, further comprising:
  executing, by the at least one processor, a duplicate check API to determine whether a copy of the base repository exists in the temporary directory in response to the clone API; and
  deleting, by the at least one processor, the copy of the base repository from the temporary directory.

7. The method of clause 1, further comprising executing, by the at least one processor, a remove API from the roll-forward library to delete all files in the temporary directory.

8. The method of clause 1, wherein the failure of the software package is automatically detected.

9. The method of clause 1, wherein the failure of the software package is indicated by a user selection of the failure.

10. The method of clause 1, wherein the software package comprises a cloud platform service.

11. A method comprising:
  detecting, by at least one processor, a failure in an software package;
  executing, by the at least one processor, a roll-forward process associated with a version control system to generate a new software package version of the software package by replacing a current software package version of the software package with a prior set of changes to the software package;
  wherein the roll-forward process comprises:
    an extraction API from the roll-forward library to extract software package data indicative of the current software package version from a release directory;
    a clone API from the roll-forward library to clone a base repository associated with the software package into a temporary directory in response to the software package data;
    wherein the base repository comprises a version history of the software package;
    an import API from the roll-forward library to import the prior set of changes from the base repository in the temporary directory into a release directory in response to the cloning of the base repository;
    wherein the prior set of changes form an old software package version of the software package relative to the current software package version of the software package at a time of the failure;
    a commit API from the roll-forward library to overwrite current software package version with the prior set of changes in the release directory to generate a new software package version of the software package;
    a push API from the roll-forward library to push the new software package version of the software package directly to the base repository; and
    a deployment API to cause the new software package version of the software package to replace the current version of the software package.

12. The method of clause 11, wherein the roll-forward process further comprises a delete request API from the roll-forward library to remove master branch protections from the base repository in response to the importing of the prior set of changes from the base repository.

13. The method of clause 12, further comprising testing, by the at least one processor, access to the base repository to confirm the removal of the master branch protections.

14. The method of clause 12, wherein the roll-forward process further comprises a put request API from the roll-forward library to restore master branch protections to the base repository in response to the overwrite of the current software package version with the prior set of changes in the release directory.

15. The method of clause 14, further comprising testing, by the at least one processor, access to the base repository to confirm the restoral of the master branch protections.

16. The method of clause 11, further comprising deleting, by the at least one processor, a copy of the base repository from the temporary directory; and
  wherein the roll-forward process further comprises a duplicate check API to determine whether the copy of the base repository exists in the temporary directory in response to the clone API.

17. The method of clause 11, wherein the roll-forward process further comprises a remove API from the roll-forward library to delete all files in the temporary directory.

18. The method of clause 11, wherein the failure of the software package is indicated by a user selection of the failure.

19. The method of clause 11, wherein the software package comprises a cloud platform service.

20. A system comprising:
  at least one version control database configured to store a temporary directory;
  at least one processor configured to perform a roll-forward process associated with a version control system to generate a new software package version of the software package by replacing a current software package version of the software package with a prior set of changes to the software package;
  wherein the roll-forward process comprises instructions that cause the at least one processor to execute the steps comprising:
    detecting a failure in an software package;
    loading a roll-forward library comprising a set of software package programming interfaces (APIs) associated with the version control system;
    executing an extraction API from the roll-forward library to extract software package data indicative of the current software package version from a release directory;
    executing a clone API from the roll-forward library to clone a base repository associated with the software package into the temporary directory in response to the software package data;
    wherein the base repository comprises a version history of the software package;
    executing an import API from the roll-forward library to import the prior set of changes from the base repository in the temporary directory into a release directory in response to the cloning of the base repository;
    wherein the prior set of changes form an old software package version of the software package relative to the current software package version of the software package at a time of the failure;

executing a commit API from the roll-forward library to overwrite current software package version with the prior set of changes in the release directory to generate the new software package version of the software package;

executing a push API from the roll-forward library to push the new software package version of the software package directly to the base repository; and executing a deployment API to cause the new software package version of the software package to replace the current software package version of the software package.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

The invention claimed is:

1. A method comprising:

detecting, by at least one processor, a failure in a software package;

loading, by the at least one processor, a roll-forward library comprising a set of software package programming interfaces (APIs) associated with a version control system;

executing, by the at least one processor, an extraction API from the roll-forward library to extract software package data indicative of a current software package version from a release directory;

executing, by the at least one processor, a clone API from the roll-forward library to clone a base repository associated with the software package into a temporary directory in response to the software package data;
wherein the base repository comprises a version history of the software package;

executing, by the at least one processor, an import API from the roll-forward library to import a prior set of changes from the base repository in the temporary directory into a release directory in response to the cloning of the base repository;
wherein the prior set of changes form an old software package version of the software package relative to the current software package version of the software package at a time of the failure;

executing, by the at least one processor, a commit API from the roll-forward library to overwrite current software package version with the prior set of changes in the release directory to generate a new software package version of the software package;

executing, by the at least one processor, a push API from the roll-forward library to push the new software package version of the software package directly to the base repository; and executing, by the at least one processor, a deployment API to cause the new software package version of the software package to replace the current software package version of the software package.

2. The method of claim 1, further comprising executing, by the at least one processor, a delete request API from the roll-forward library to remove master branch protections from the base repository in response to the importing of the prior set of changes from the base repository.

3. The method of claim 2, further comprising testing, by the at least one processor, access to the base repository to confirm the removal of the master branch protections.

4. The method of claim 2, further comprising executing, by the at least one processor, a put request API from the roll-forward library to restore master branch protections to the base repository in response to the overwrite of the current software package version with the prior set of changes in the release directory.

5. The method of claim 4, further comprising testing, by the at least one processor, access to the base repository to confirm the restoral of the master branch protections.

6. The method of claim 1, further comprising:

executing, by the at least one processor, a duplicate check API to determine whether a copy of the base repository exists in the temporary directory in response to the clone API; and deleting, by the at least one processor, the copy of the base repository from the temporary directory.

7. The method of claim 1, further comprising executing, by the at least one processor, a remove API from the roll-forward library to delete all files in the temporary directory.

8. The method of claim 1, wherein the failure of the software package is automatically detected.

9. The method of claim 1, wherein the failure of the software package is indicated by a user selection of the failure.

10. The method of claim 1, wherein the software package comprises a cloud platform service.

11. A method comprising:

detecting, by at least one processor, a failure in a software package;

executing, by the at least one processor, a roll-forward process associated with a version control system to generate a new software package version of the software package by replacing a current software package version of the software package with a prior set of changes to the software package;

wherein the roll-forward process comprises:

an extraction API from the roll-forward library to extract software package data indicative of the current software package version from a release directory;

a clone API from the roll-forward library to clone a base repository associated with the software package into a temporary directory in response to the software package data;
wherein the base repository comprises a version history of the software package;

an import API from the roll-forward library to import the prior set of changes from the base repository in the temporary directory into a release directory in response to the cloning of the base repository;
wherein the prior set of changes form an old software package version of the software package relative to the current software package version of the software package at a time of the failure;

a commit API from the roll-forward library to overwrite current software package version with the prior set of changes in the release directory to generate a new software package version of the software package;

a push API from the roll-forward library to push the new software package version of the software package directly to the base repository; and a deployment API to cause the new software package version of the software package to replace the current version of the software package.

12. The method of claim 11, wherein the roll-forward process further comprises a delete request API from the roll-forward library to remove master branch protections from the base repository in response to the importing of the prior set of changes from the base repository.

13. The method of claim 12, further comprising testing, by the at least one processor, access to the base repository to confirm the removal of the master branch protections.

14. The method of claim 12, wherein the roll-forward process further comprises a put request API from the roll-forward library to restore master branch protections to the base repository in response to the overwrite of the current software package version with the prior set of changes in the release directory.

15. The method of claim 14, further comprising testing, by the at least one processor, access to the base repository to confirm the restoral of the master branch protections.

16. The method of claim 11, further comprising deleting, by the at least one processor, a copy of the base repository from the temporary directory; and wherein the roll-forward process further comprises a duplicate check API to determine whether the copy of the base repository exists in the temporary directory in response to the clone API.

17. The method of claim 11, wherein the roll-forward process further comprises a remove API from the roll-forward library to delete all files in the temporary directory.

18. The method of claim 11, wherein the failure of the software package is indicated by a user selection of the failure.

19. The method of claim 11, wherein the software package comprises a cloud platform service.

20. A system comprising:

at least one version control database configured to store a temporary directory;

at least one processor configured to perform a roll-forward process associated with a version control system to generate a new software package version of the software package by replacing a current software package version of the software package with a prior set of changes to the software package;

wherein the roll-forward process comprises instructions that cause the at least one processor to execute the steps comprising:

detecting a failure in a software package;

loading a roll-forward library comprising a set of software package programming interfaces (APIs) associated with the version control system;

executing an extraction API from the roll-forward library to extract software package data indicative of the current software package version from a release directory;

executing a clone API from the roll-forward library to clone a base repository associated with the software package into the temporary directory in response to the software package data;

wherein the base repository comprises a version history of the software package;

executing an import API from the roll-forward library to import the prior set of changes from the base repository in the temporary directory into a release directory in response to the cloning of the base repository;

wherein the prior set of changes form an old software package version of the software package relative to the current software package version of the software package at a time of the failure;

executing a commit API from the roll-forward library to overwrite current software package version with the prior set of changes in the release directory to generate the new software package version of the software package;

executing a push API from the roll-forward library to push the new software package version of the software package directly to the base repository; and executing a deployment API to cause the new software package version of the software package to replace the current software package version of the software package.

* * * * *